R. JENNINGS.

Wood-Auger.

No. 2,146. Reissued Jan. 16, 1866.

Witnesses:
Edward A. Knight
John A. Gredersheim

Inventor.
Russel Jennings
per
Munn & Co
Attys

N. PETERS, PHOTO-LITHOGRAPHER, WASHINGTON, D. C.

UNITED STATES PATENT OFFICE.

RUSSELL JENNINGS, OF DEEP RIVER, CONNECTICUT.

IMPROVEMENT IN AUGERS.

Specification forming part of Letters Patent No. 12,318, dated January 30, 1855; Reissue No. 2,081, dated October 3, 1865; Reissue No. 2,146, dated January 16, 1866.

*To all whom it may concern:*

Be it known that I, RUSSELL JENNINGS, of Deep River, in the county of Middlesex and State of Connecticut, have invented a new and useful Improvement in the Double-Twist Auger, of which the following is a full, clear, and exact description, reference being had to the accompanying drawings, which form a part of this specification, and in which—

Figure 1:
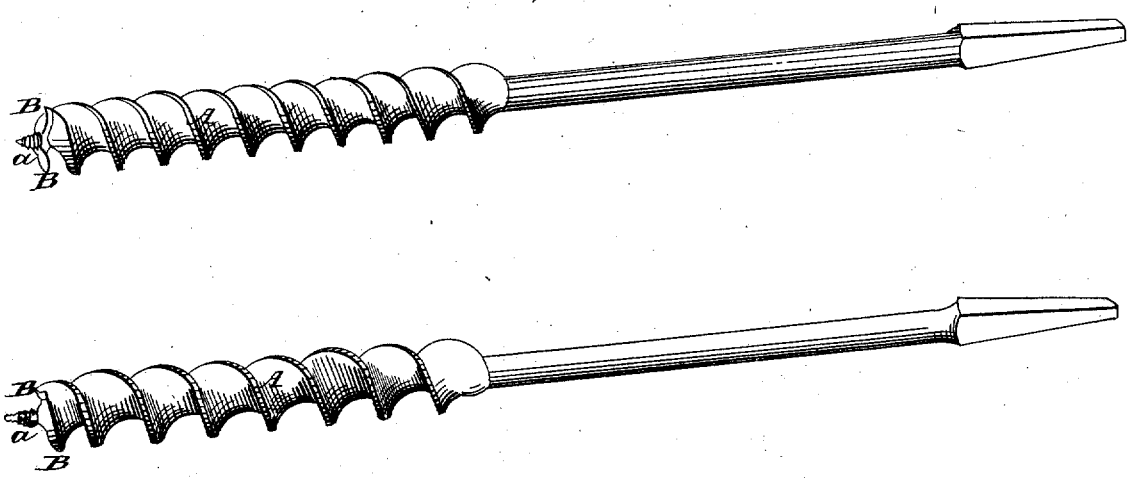
Figure 2:
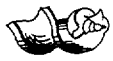

Figure 1 represents a side elevation of my double-twist auger. Fig. 2 is an end view of the same.

Augers, as usually constructed, are composed of two members, the cutting-bit, and the pod, the latter acting to discharge the chips separated by the former. The cutting-bit in double-twist augers has two radial cutting-edges or floor-lips extending from the pintle or screw to the periphery of the twisted pod. Each floor-lip is furnished at its outer corner with a spur or cutter, which, projecting in the direction of the axis of the auger beyond its cutting-edge, cuts round the periphery of the cylinder of wood removed by the floor-lips. The spur thus described, being at the outer corner of the floor-lips, acts in conjunction with it, and augers thus constructed are very defective; first, because the spur is projected at the thinner part of the floor-lip, and to be useful as a cutter must be made too thin for durability and strength; hence it, together with the portion of the cutting-edge of the floor-lip, from which it is projected, is continually liable to break off in using, and this liability to break is so great that augers thus constructed are considered unfit for boring hard wood. This contiguity of the cutting-edge of the floor-lip and the spur is also objectionable, because when the former is broken by boring against a nail or other hard substance there is no material in reserve to allow a new cutting-edge to be filed farther back on the lip, and the instrument becomes useless. Another difficulty arising from this contiguity of the cutting-edge of the floor-lip and the spur is that when the former is cutting a chip the latter acts to cut round the edge of the next succeeding chip in exact conjunction of the former; hence each interferes with the action of the other, the fibers of the wood are torn as the bit enters, and the hole is not bored smoothly.

My improved double-twist auger is designed to overcome these objections; and my improvement consists in constructing the cutting-bit in such a manner that the floor-lip and the spur, instead of acting in conjunction, act separately and independently of each other.

The instrument, as represented in the drawings, is constructed with a double-twisted pod, A, and the two floor-lips B B. The latter project beyond the positions in which they have heretofore been placed, and the spur *a*, instead of being situated at the outer front corner of the cutting-edge of the floor-lip, where the latter, from its necessary thinness, is weakest, is projected from its hinder part or heel, where it is thickest and strongest. By this change in the relative position of the cutting-edge of the floor-lip and the spur I effect a new relationship between them, so that the one in acting does not interfere with the operation of the other, and an instrument is obtained which is strong and durable, while at the same time it requires less power to operate it than the common auger, produces a smoother hole, and will bore faster without danger of breakage. These advantages insure, first, because the spur, being situated some distance behind the cutting-edge of the floor-lip, does not necessarily act to cut throughout its entire length, and hence its root can be made larger than is possible in the ordinary method of constructing double-twist augers, where its increase in size at the outer corner of the floor-lip would impede the action of the instrument; secondly, as the spur is projected from the strongest part of the lip it is not liable to break with the strain and carry with it a portion of the floor-lip; thirdly, the instrument is much more durable because, as the floor-lip is filed away a sufficient quantity of material is in reserve to form a new cutting-edge, and as the spur can be made heavier and stronger it also is of sufficient size to admit of a considerable amount of filing before its strength is materially impaired.

The efficiency of this instrument and the smoothness of the hole bored are the necessary results of this improved construction, first, because the wood upon which the spur, is acting is not disturbed by the floor-lip, and remains firm both before and behind the spur, which thus acts smoothly round the edge of the chip to be removed by the succeeding floor-lip; secondly, because the chips removed by the floor-lip, being undisturbed by the action of the spur, pass freely out of the hole as fast as they are cut, thus preventing the choking of the pod.

The double-twist auger thus constructed becomes an efficient instrument for boring hard woods either across or endwise with the grain, for which purpose the ordinary double-twist augers are almost useless.

It may be constructed with or without the side lip projecting upward from the periphery of the floor lip; but I prefer to construct it as represented in the accompanying drawings, without this addition, which is useless when the spur performs its work efficiently, as it must in my auger.

Having thus described my invention, what I claim therein as new, and desire to secure by Letters Patent, is—

The projecting of the floor-lips in advance of the cutting-spur substantially as herein described and for the purpose herein set forth.

RUSSELL JENNINGS.

Witnesses:

EDWARD H. KNIGHT,
ALEX. A. C. KLAUCKE.